United States Patent
Wiater (10) Patent No.: US 9,796,132 B2
(45) Date of Patent: Oct. 24, 2017

(54) FLOATING MANDREL AND METHOD OF RF WELDING USING A FLOATING MANDREL

(71) Applicant: Dielectrics Industries, Inc., Chicopee, MA (US)

(72) Inventor: Stephen J. Wiater, Southwick, MA (US)

(73) Assignee: DIELECTRICS INDUSTRIES, INC., Chicopee, MA (US)

( * ) Notice: Subject to any disclaimer, the term of this patent is extended or adjusted under 35 U.S.C. 154(b) by 738 days.

(21) Appl. No.: 14/281,160

(22) Filed: May 19, 2014

(65) Prior Publication Data

US 2014/0339224 A1  Nov. 20, 2014

Related U.S. Application Data

(60) Provisional application No. 61/825,308, filed on May 20, 2013.

(51) Int. Cl.
| | |
|---|---|
| *B29C 65/04* | (2006.01) |
| *B29C 67/00* | (2017.01) |
| *A47C 27/08* | (2006.01) |
| *A47C 27/10* | (2006.01) |
| *B29C 65/00* | (2006.01) |
| *B29L 22/02* | (2006.01) |
| *B29L 31/00* | (2006.01) |

(52) U.S. Cl.
CPC .......... *B29C 65/04* (2013.01); *B29C 66/1122* (2013.01); *B29C 66/133* (2013.01); *B29C 66/438* (2013.01); *B29C 66/49* (2013.01); *B29C 66/73921* (2013.01); *B29C 66/8322* (2013.01); *B29C 66/843* (2013.01); *B29C 66/8432* (2013.01); *B29C 66/92655* (2013.01); *B29C 66/71* (2013.01); *B29C 66/8122* (2013.01); *B29L 2022/02* (2013.01); *B29L 2031/751* (2013.01)

(58) Field of Classification Search
CPC ... B29C 65/04; B29C 66/1122; B29C 66/133; B29C 66/438; B29C 66/49; B29C 66/73921; B29C 66/8322; B29C 66/843; B29C 66/8432; B29C 66/92655; B29C 66/71; B29C 66/8122; B29L 2022/02; B29L 2031/751
USPC .......... 219/765, 769, 777; 156/273.7, 274.4, 156/380.6; 5/706, 710, 713, 722, 727, 5/932
See application file for complete search history.

(56) References Cited

U.S. PATENT DOCUMENTS

| | | | | |
|---|---|---|---|---|
| 4,954,678 A | * | 9/1990 | Harmony | B29C 57/00 156/273.7 |
| 5,991,949 A | * | 11/1999 | Miller, Sr. | A61G 7/05769 5/710 |
| 9,254,047 B1 | * | 2/2016 | Schermel | A47C 27/083 |

* cited by examiner

*Primary Examiner* — Quang Van
(74) *Attorney, Agent, or Firm* — Cantor Colburn LLP (57) ABSTRACT

A mandrel for use in welding an air mattress having a top layer, bottom layer and at least one baffle joining the top layer and bottom layer, the mandrel includes a central mounting block; a baffle locating pin on a top surface of the central mounting block for securing the baffle to the central mounting block; a conductive sealing surface positioned along an edge of the central mounting block; a stop block positioned on the top surface of the central mounting block adjacent the sealing surface; and a bumper mounted to the central mounting block.

3 Claims, 9 Drawing Sheets

FLOATING MANDREL AND METHOD OF RF WELDING USING A FLOATING MANDREL

CROSS-REFERENCE TO RELATED APPLICATIONS

This application claims the benefit of U.S. provisional patent application Ser. No. 61/825,308, filed May 20, 2013, the entire contents of which are incorporated herein by reference.

BACKGROUND

Most dielectric welding machines are designed to transmit powerful radio frequency waves from the generator through a head plate, and subsequently to an electrode of a certain shape. The electrode then radiates the RF energy through a thermoplastic (with a high dielectric constant) toward a grounding plate. The thermoplastic is selected based on its sensitivity to the machine's frequency (nominally 27.12 GHz) and its tendency to breakdown quickly and change phase.

In the case where multi-dimensional welding is desired, products are generally constructed by layering up multiple welds, using switching machines, or inserting grounding plates/mandrels between layers of material to control when and where the weld occurs. These techniques are often complex.

SUMMARY

Embodiments relate to welding certain 3D constructions by using a non-grounded/non-powered floating mandrel. In an embodiment, the mandrel and tooling set design is used to fabricate vertical baffles that are embedded in an air mattress.

DETAILED DESCRIPTION

Figure 1:
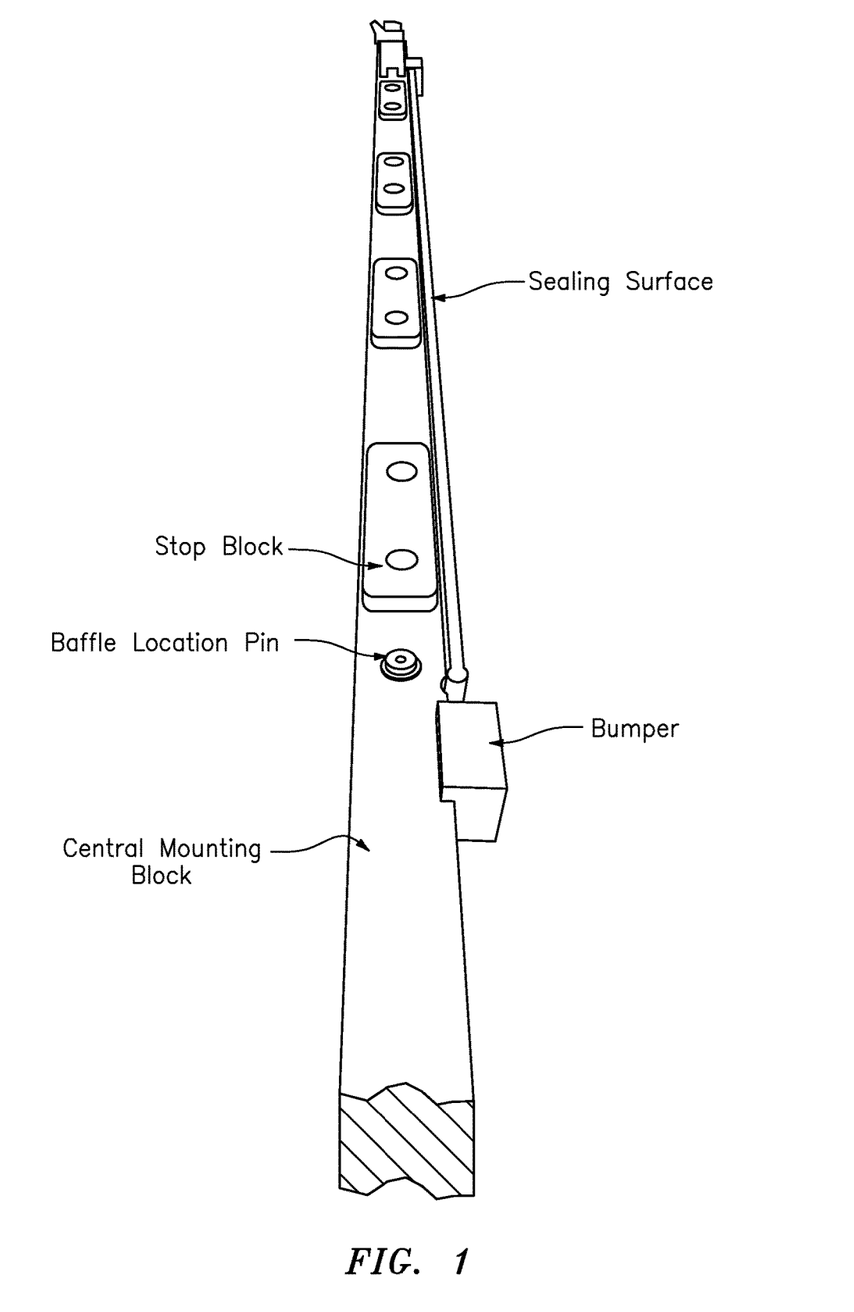
FIG. 1 depicts a mandrel in an exemplary embodiment.
Figure 3:
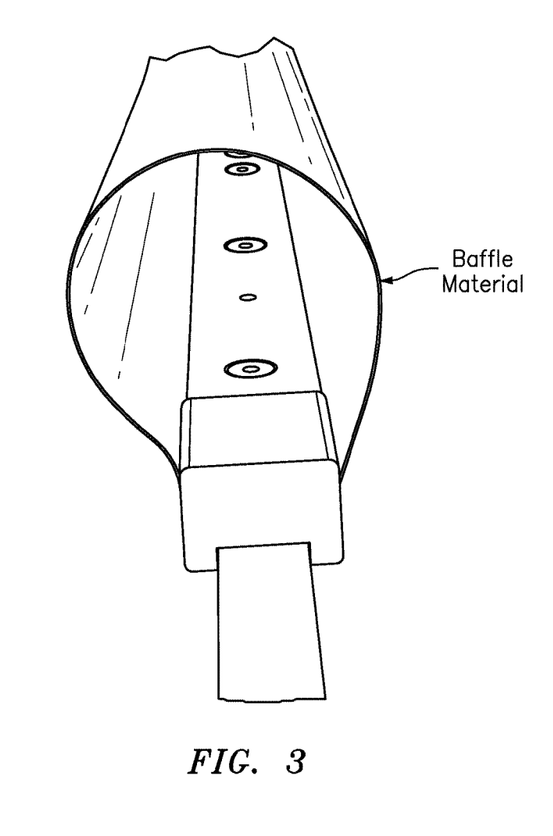
FIG. 3 depicts a mandrel and baffle material in an exemplary embodiment.
Figure 4:
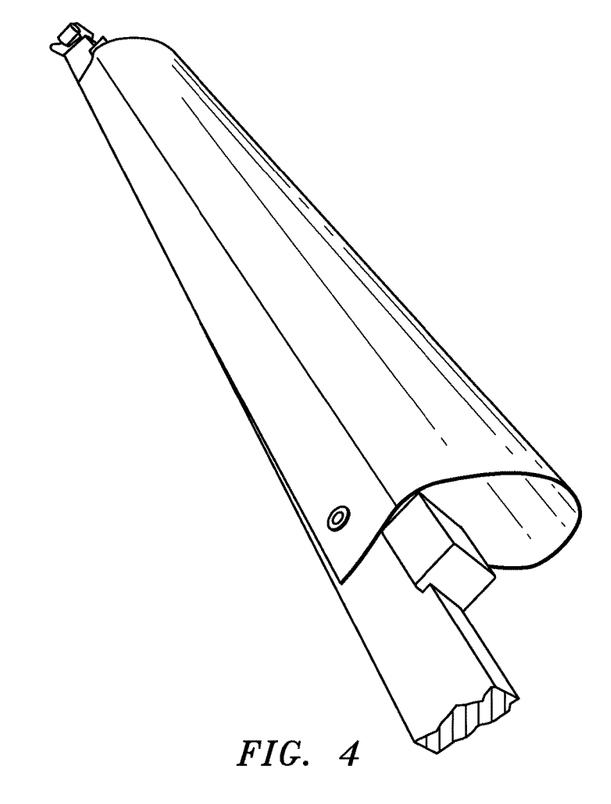
FIG. 4 depicts a mandrel and baffle material in an exemplary embodiment.

Embodiments of the invention use a standard RF welding machine is to fabricate baffles in an inflatable item. The upper and lower platens of the welding machine are both featureless. Mandrels in accordance with embodiments of the invention facilitate manufacture. FIG. 1 depicts an exemplary mandrel. During a loading cycle, the mandrels are wrapped with baffles made up of pre-cut thermoplastic film (e.g., polyurethane) and mounted on location pins, on the top and bottom of a central mounting block. FIGS. 3 and 4 show baffle material mounted to the mandrel. Bushings are located on the mandrel to locate the mandrel on the base plate. The bushings may be made from a non-conductive plastic and engage pins on the lower platen or base plate. The mandrels do not have electrical contact with the grounding plate and essentially float between the upper platen (which radiates RF energy during the welding cycle) and the lower grounding plate.

In one embodiment, the mandrels are used to weld three layers of thermoplastic material together. For the purposes of illustration, they are named layers A, B, and C. All three layers are pre-cut with location holes so that they may be registered to one another during the welding cycle. During the loading cycle, layer B (the middle layer or baffle material) is wrapped around the floating mandrel and held in place by way of matched die-cut holes and baffle location pins (which function much like a button).

Figure 5:
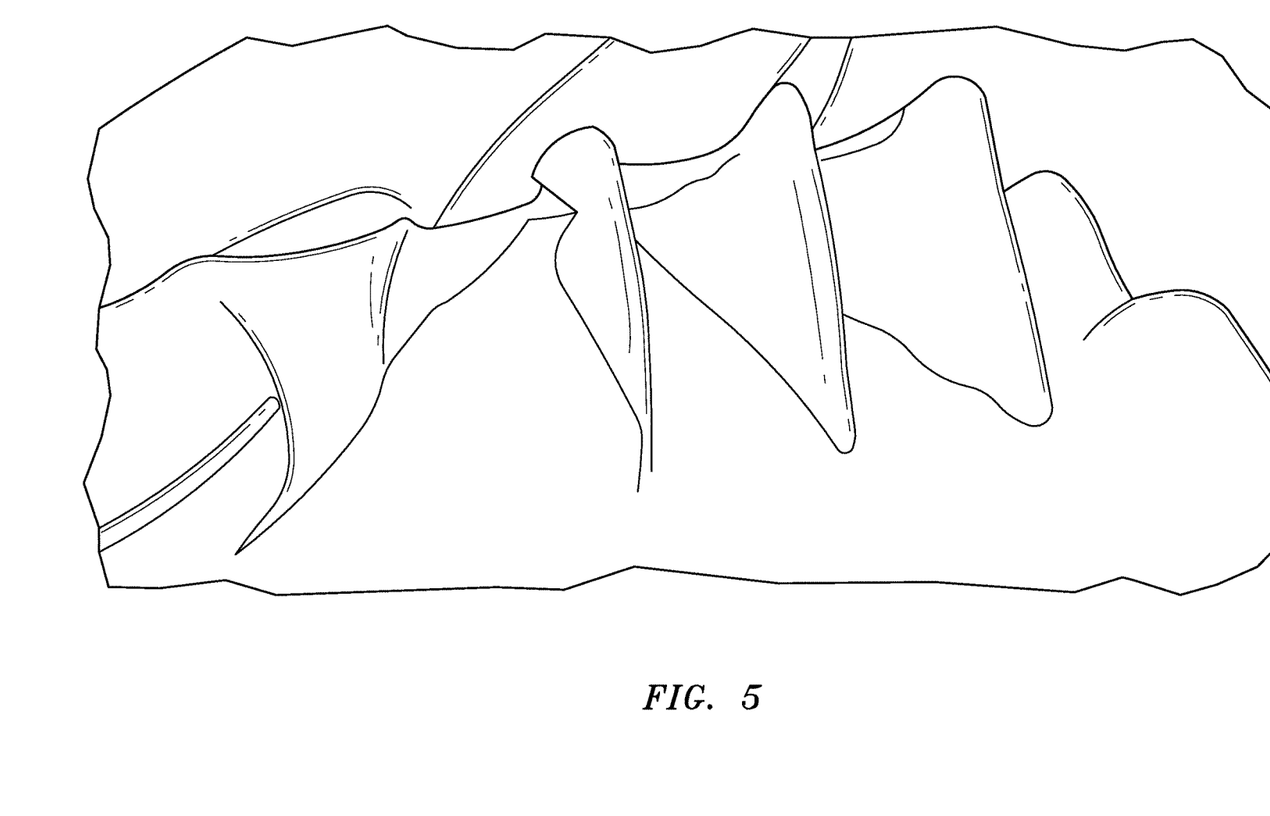
FIG. 5 depicts a baffle layer in an exemplary embodiment.
Figure 6:
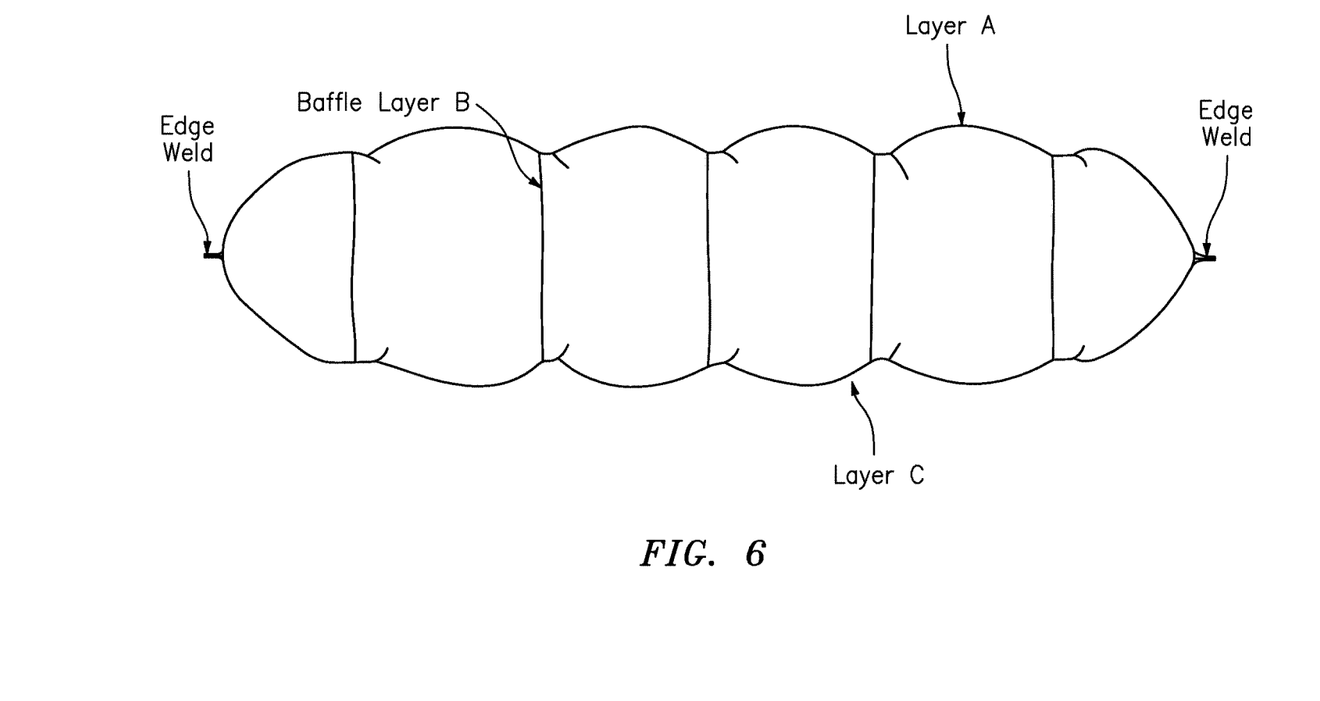
FIG. 6 depicts a baffle layer in an exemplary embodiment.

FIGS. 3 and 4 show baffle material mounted to the mandrel. The back layer of the air mattress, also called C, is loaded on pins connected to the base plate, and the mandrel with the B layer is loaded on top of layer C. The top layer of the air mattress, also called A, is then loaded on top of layers B and C. During the welding cycle, layers A/B and B/C are both welded to each other, but layer B is not welded to itself This is done is such a way that once the mandrels are removed, a perpendicular sheet (layer B) connects the top and bottom sheets (layers A and C) as shown in FIGS. 5 and 6. In a subsequent operation, layers A and C are welded together around their edges to make an airtight bladder that can be inflated. The dual purpose layer B (also called a baffle) is to both restrict the volume of the inflated bladder and to force layers A and C to remain relatively flat upon inflation.

Figure 7:
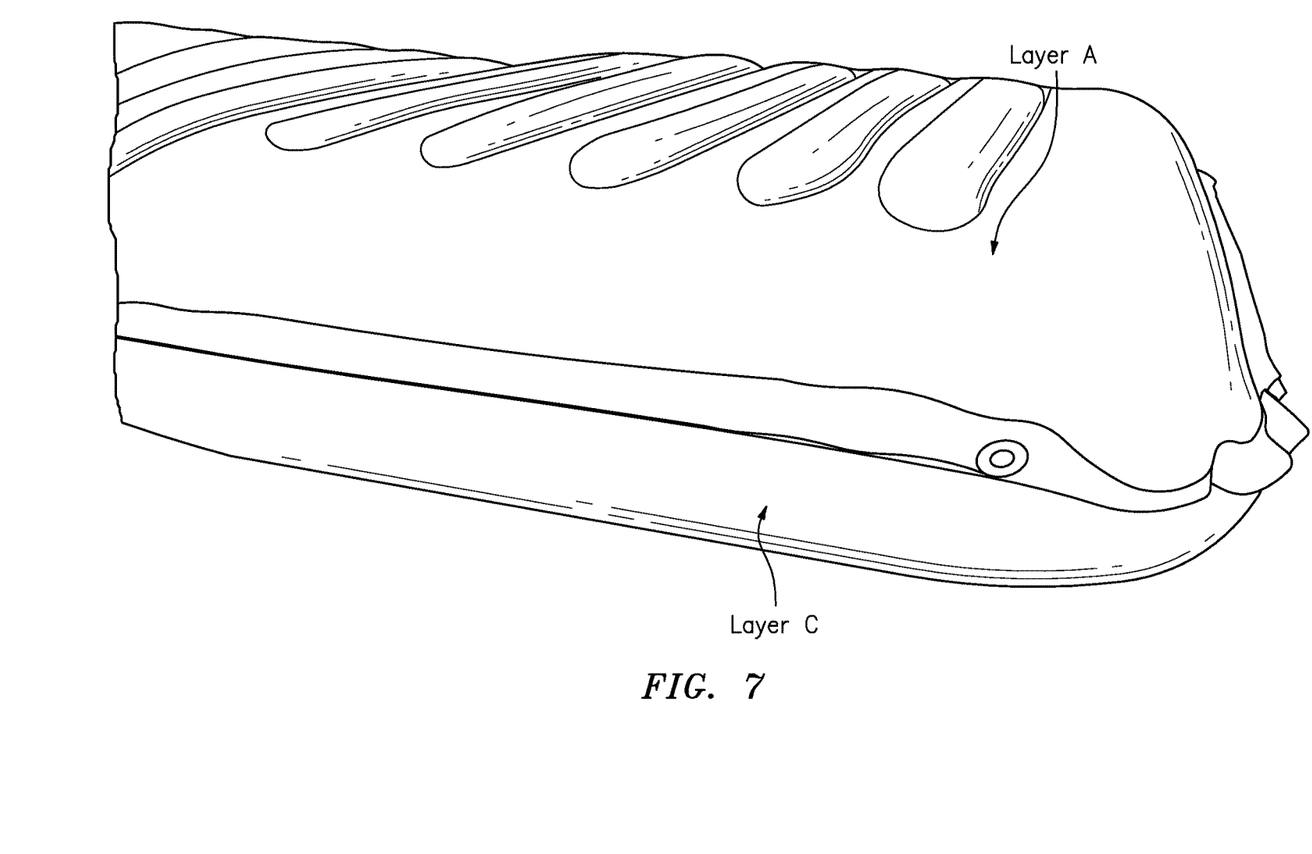
FIG. 7 depicts an inflatable mattress in an exemplary embodiment.
Figure 8:
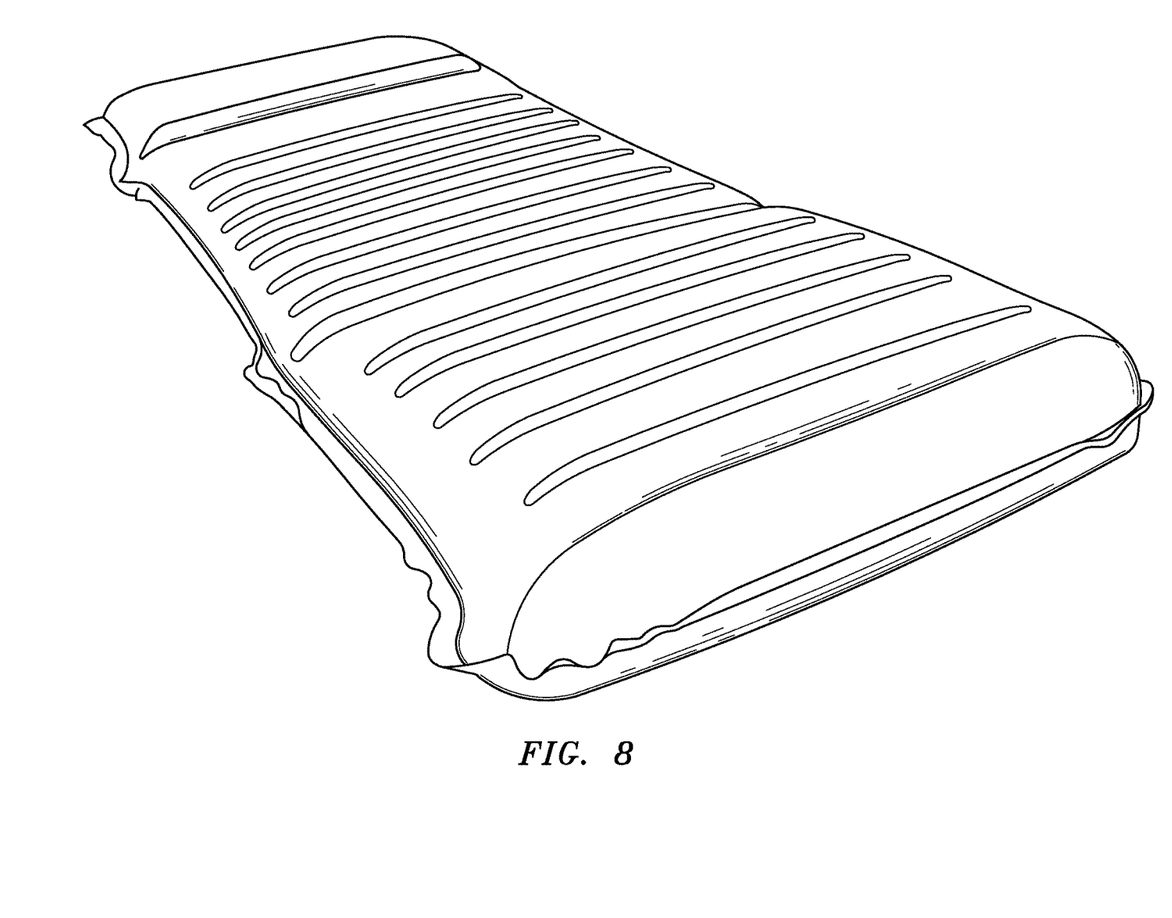
FIG. 8 depicts an inflatable mattress in an exemplary embodiment.

FIGS. 7 and 8 depict the air mattress inflated. The scalloped top surface (layer A) is caused by the baffles restricting the inflation of the bladder. The bladder also illustrates the completed perimeter welds around the edges, connecting layers A and C.

In a typical RF welding tooling set, there is one electrode and one grounded plate (also called a base plate). In order to fabricate the baffles more efficiently, floating mandrels are used to position and weld the baffles. This mandrel is neither electrically connected to the transmitting head, nor the grounded base plate as it essentially floats between them during the welding cycle. The mandrel itself holds a two-sided tool, whose shape creates the welds between layers A/B and B/C. During the welding cycle the upper head radiates an RF wave toward the ground plate. The RF wave first passes through layers A and B and into the sealing surface mounted on the mandrel. The upper surface of the tool's sealing surface presses layers A and B together against the upper plate and compresses them. The tool, given that it is not grounded, nor actively electrified, also acts as a capacitor and stores some of that energy. The energy (RF wave) is absorbed by the thermoplastic materials layers A and B, which causes them to change phase and melt.

Simultaneously the mandrel and sealing surface transmits (radiates) some of that energy from the bottom of the tool face through layers B and C toward the grounded plate. Those materials also change phase and melt, forming a second weld. Once the welding cycle is complete, the transmission stops and the thermoplastic materials return to their solid state once again and solidify together.

Figure 2:
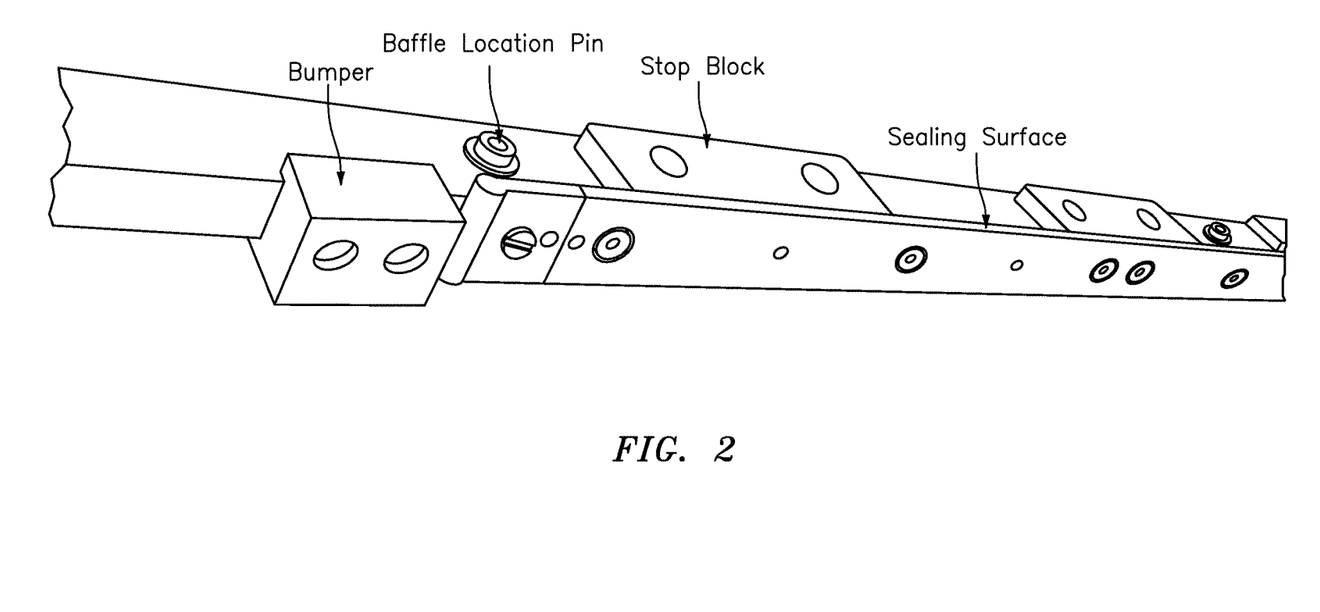
FIG. 2 depicts a mandrel in an exemplary embodiment.

One feature of the mandrel is its ability to control the flow of the molten material during the welding cycle. Since the materials are clamped tightly in between the press and the mandrel when they melt, they have a tendency to flow away from the pressure. If insufficient pressure is applied to the materials, they will not mix together and form a bond to each other during the welding cycle. Conversely, if too much material flows away from the weld target, the mass of the weld is reduced and could cause an incomplete or weak weld. The mandrel includes one or more stop blocks (FIGS. 1 and 2), whose shape and thickness is designed to prevent an over compression of the materials during the welding cycle. Stop blocks may be positioned on the top and bottom surfaces of the central mounting block. The stop block is fabricated from a material (e.g., polycarbonate) that is insensitive to the welding frequencies and does not soften or move during welding, and is shown in FIGS. 1 and 2.

The mandrel sealing surface, which is fabricated from a metal that effectively transmits RF (e.g., brass), can be sharp and heavy. The edge of this tool could damage the thermoplastic films during handling. The mandrel incorporates a bumper, shown in FIGS. 1 and 2, also fabricated from a non-conductive material, which prevents accidental contact of the sealing surface with the thermoplastic films.

The central mounting block is a bar upon which all of the mandrel features are affixed. The central mounting block also has the mounting features, such as bushings, that interface with the location pins on the base plate. The central mounting block itself can be fabricated either from a metal (such as aluminum) or plastic (such as Delrin or ABS), depending on how much RF capacitance is required for the machine setup.

Figure 9:
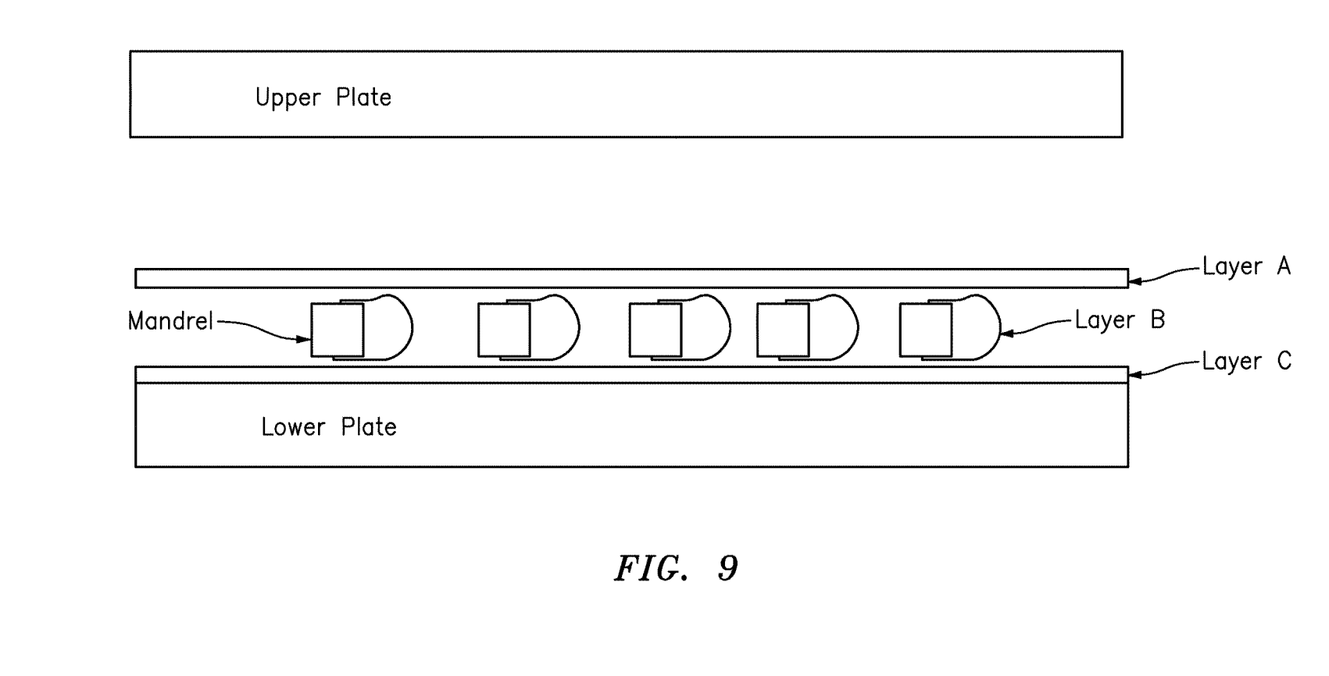
FIG. 9 depicts an inflatable mattress in an exemplary embodiment.

FIG. 9 illustrates the welding process, where a layer C of thermoplastics material is positioned on a lower plate. Pins on lower plate may be used to align layer into a predetermined position. Mandrels having layer B mounted thereon are position above layer C. As noted above, bushings on the mandrels may be used to align the mandrels to the lower plate and layer C. Layer A is placed over the mandrels, and may be aligned with mandrels through pins of other features on the mandrels. Upper plate is then lowered on to layer A, and pressure and RF energy applied by the upper plate. Layers A and C may then be sealed along their edges.

While embodiments have been shown and described with reference to the exemplary embodiments as illustrated in the drawings, it will be recognized by those skilled in the art that various modifications may be made without departing from the spirit and scope of the invention. Therefore, it is intended that the present disclosure not be limited to the particular embodiment(s) disclosed herein, but that the disclosure will include all embodiments falling within the scope of the appended claims.

The invention claimed is:

1. A mandrel for use in welding an inflatable item having a top layer, bottom layer and at least one baffle joining the top layer and bottom layer, the mandrel comprising:
   a central mounting block;
   a baffle locating pin on a top surface of the central mounting block for securing the baffle to the central mounting block;
   a conductive sealing surface positioned along an edge of the central mounting block;
   a stop block positioned on the top surface of the central mounting block adjacent the sealing surface; and
   a bumper mounted to the central mounting block.

2. A mandrel for use in welding an inflatable item having a top layer, bottom layer and at least one baffle joining the top layer and bottom layer, the mandrel comprising:
   a central mounting block;
   a baffle locating pin on a top surface of the central mounting block for securing the baffle to the central mounting block; and
   a conductive sealing surface positioned along an edge of the central mounting block.

3. A method of welding an inflatable item having a top layer, bottom layer and at least one baffle joining the top layer and bottom layer, the method comprising:
   placing a baffle layer about a mandrel, the mandrel including:
      a central mounting block;
      a baffle locating pin on a top surface of the central mounting block for securing the baffle to the central mounting block; and
      a conductive sealing surface positioned along an edge of the central mounting block;
   placing the top layer above the mandrel and the bottom layer below the mandrel.

* * * * *